United States Patent
Kalbfell et al.

(10) Patent No.: US 12,005,027 B2
(45) Date of Patent: Jun. 11, 2024

(54) SYSTEM WITH IMPROVED SEAL BETWEEN A LIQUID CONTAINER AND A MANIFOLD

(71) Applicant: Siemens Healthcare Diagnostics Inc., Tarrytown, NY (US)

(72) Inventors: Heiko Kalbfell, Taunusstein (DE); Joachim Bernhard, Karben (DE)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 17/755,894

(22) PCT Filed: Nov. 10, 2020

(86) PCT No.: PCT/US2020/059883
§ 371 (c)(1),
(2) Date: May 11, 2022

(87) PCT Pub. No.: WO2021/096885
PCT Pub. Date: May 20, 2021

(65) Prior Publication Data
US 2022/0354744 A1 Nov. 10, 2022

Related U.S. Application Data

(60) Provisional application No. 62/934,470, filed on Nov. 12, 2019.

(51) Int. Cl.
*A61J 1/14* (2023.01)
*G01N 15/08* (2006.01)
(Continued)

(52) U.S. Cl.
CPC ........ *A61J 1/1418* (2015.05); *G01N 15/0806* (2013.01); *G01N 35/10* (2013.01);
(Continued)

(58) Field of Classification Search
CPC ... A61J 1/1418; G01N 15/0806; G01N 35/10; G01N 2035/0403; G01N 2035/0429;
(Continued)

(56) References Cited

U.S. PATENT DOCUMENTS

| 4,562,871 A | 1/1986 | Astle |
| 5,102,010 A | 4/1992 | Osgar et al. |

(Continued)

FOREIGN PATENT DOCUMENTS

| EP | 1947039 A1 * | 7/2008 | ........... B65D 90/623 |
| JP | S58-194153 U | 12/1983 | |

(Continued)

OTHER PUBLICATIONS

ISO 2852, Stainless steel clamp pipe couplings for the food industry, International Standard, Second Edition, 1993 (Year: 1993).*

(Continued)

*Primary Examiner* — Benjamin R Whatley
*Assistant Examiner* — Curtis A Thompson (57) ABSTRACT

The invention relates to a system with a seal between a manifold and a liquid container in which a sealing without an elastomer material is used, wherein the sealing properties of the seal are independent of the rotational position of the manifold in relation to the container.

11 Claims, 6 Drawing Sheets

(51) Int. Cl.
  *G01N 35/10* (2006.01)
  *G01N 35/04* (2006.01)
(52) U.S. Cl.
  CPC . *B01L 2200/026* (2013.01); *B01L 2200/0689* (2013.01); *B01L 2400/0487* (2013.01); *G01N 2035/0403* (2013.01); *G01N 2035/0429* (2013.01)
(58) Field of Classification Search
  CPC ....... B01L 2200/026; B01L 2200/0689; B01L 2400/0487; B01L 3/523
  See application file for complete search history.

(56) References Cited

U.S. PATENT DOCUMENTS

| | | | |
|---|---|---|---|
| 5,163,582 A | 11/1992 | Godolphin et al. | |
| 2003/0151745 A1* | 8/2003 | Fernando | G01N 21/59 356/446 |
| 2004/0247405 A1* | 12/2004 | Keightley | B23B 51/0473 408/204 |
| 2007/0292574 A1* | 12/2007 | Ling | F16J 13/065 261/DIG. 7 |
| 2010/0084049 A1* | 4/2010 | Smith | B65G 69/183 141/383 |
| 2014/0080226 A1* | 3/2014 | Cauley, III | B01L 3/502784 436/180 |
| 2014/0272965 A1 | 9/2014 | Handique et al. | |
| 2014/0314623 A1* | 10/2014 | Yamagata | G01N 35/026 422/63 |
| 2016/0340202 A1* | 11/2016 | Lautzenheiser | E03C 1/02 |
| 2017/0191589 A1* | 7/2017 | Floyd | F16L 23/06 |
| 2017/0209816 A1* | 7/2017 | Adrian | B01L 3/5635 |
| 2017/0333891 A1 | 11/2017 | Nobile et al. | |
| 2018/0297753 A1* | 10/2018 | Zumbrum | B67D 3/0061 |
| 2019/0054471 A1 | 2/2019 | Williams et al. | |
| 2019/0234982 A1 | 8/2019 | Bracher | |

FOREIGN PATENT DOCUMENTS

| | | |
|---|---|---|
| JP | S62-087860 A | 4/1987 |
| JP | 2013-036600 | 2/2013 |
| WO | 2013/002213 A1 | 1/2013 |

OTHER PUBLICATIONS

Extended EP Search Report dated Nov. 14, 2022 of corresponding European Application No. 20887515.3, 5 Pages.
PCT International Search Report and Written Opinion dated Feb. 4, 2021 (6 Pages).
English translation of Japanese Office Action of corresponding Japanese patent Application No. 2022-527110 14 Pages.

* cited by examiner

SYSTEM WITH IMPROVED SEAL BETWEEN A LIQUID CONTAINER AND A MANIFOLD

CROSS REFERENCE TO RELATED APPLICATION

This application claims priority to U.S. Provisional Patent Application No. 62/934,470, entitled "SYSTEM WITH IMPROVED SEAL BETWEEN A LIQUID CONTAINER AND A MANIFOLD" filed Nov. 12, 2019, the disclosure of which is hereby incorporated by reference in its entirety for all purposes.

TECHNICAL FIELD

The present application relates to a system comprising a liquid container configured to hold a liquid and a manifold through which liquid is supplied to, and removed from, the liquid container.

BACKGROUND

In the art, analyzing systems are known in which liquid containers are provided holding liquids to be analyzed. For example, the liquid containers can be used in connection with the determination of the blood coagulation. These liquid containers need to be cleaned and each of the liquid containers is connected to different cleaning liquids through a manifold. Generally, the manifold holds a valve and a bulk bottle on the top. The valve controls the fluid flow from the bulk bottle through the manifold to the liquid container. The connection between the manifold and the liquid container needs to be leakproof, even when the liquid container is in motion, for example, when a drawer in which the liquid container is provided is opened or closed. Furthermore, the orientation of the liquid container relative to the manifold needs to be adjustable without compromising the leakproof connection. Furthermore, it is desirable to attach and detach the leakproof connection with only one hand.

In the art, elastic sealings are used to form the leakproof connection between a liquid container and a manifold. Depending on the corrosiveness of the fluid involved, the elastic sealing needs to be of a higher grade. The elastic sealing is compressed to function as a seal, wherein the compression is usually achieved through a screw thread. To obtain a defined compression, a defined torque is needed. Depending on the tolerances of the parts involved, this torque is achieved at different angles between the liquid container and the manifold. Accordingly, this leads to a nonuniform assembly of a plurality of liquid containers arranged next to each other if the manifold and the liquid container are not rotationally symmetric.

SUMMARY

Accordingly, a need exists to overcome the above-identified drawbacks and to provide a system in which the seal between the manifold and the liquid container is improved, and which provides a sealed connection between the liquid container and the manifold for different liquids having different aggressiveness.

This need is met by the features of the independent claim. Further aspects are described in the dependent claims.

According to a first aspect, a system is provided comprising a liquid container configured to hold liquid. The system further comprises a manifold through which the liquid is supplied to, and removed from, the liquid container. The manifold comprises a sealing protrusion having a conical shape with an outer peripheral sealing surface. The liquid container comprises an opening and a conically-shaped rim surrounding the opening such that the diameter of the opening decreases towards an interior of the liquid container. In a connected state of the system, the manifold is located on the opening to supply liquid to, and remove liquid from, the liquid container. The conically-shaped rim comprises an inner peripheral support surface and, in the connected state, the outer peripheral sealing surface contacts the inner peripheral support surface. The system further comprises a pressure generating element configured to be moved by a user between a closed position and an open position, and comprising a circumferential first pressure applying surface and a second circumferential pressure applying surface. The liquid container comprises a container pressure exposure surface, and the manifold comprises a manifold pressure exposure surface. In the open position of the pressure generating element, the first pressure applying surface contacts the container pressure exposure surface, and the second pressure applying surface contacts the manifold pressure exposure surface. In the closed position, the manifold is fixedly connected to the liquid container. Hence, the first pressure applying surface is configured to apply a first force to the container pressure exposure surface, and the second pressure applying surface is configured to apply a second force to the manifold pressure exposure surface. This presses the outer peripheral sealing surface of the manifold onto the inner peripheral support surface of the liquid container in order to obtain the sealed connection between the liquid container and the manifold.

Preferably, the outer peripheral sealing surface and the inner peripheral support surface are made of injection-molded material, and the injection-molded materials directly contact one another and provide the sealed connection between the manifold and the liquid container. Preferably, a contact area where the peripheral support surface contacts the outer peripheral sealing surface is substantially free of any elastomer material.

With the pressure generating element and the pressure applying surfaces and the pressure exposure surface on the manifold and the liquid container a tight connection is obtained at the inner peripheral support surface and the outer peripheral sealing surface.

When the injection-molded materials are used, which directly contact each other without any elastomer material in between, a long-lasting seal is obtained which does not degrade over time and can, therefore, be used for different liquids having different aggressiveness values.

The present invention further provides an automated analysis machine comprising at least one system according to the invention. Preferably, the automated analysis machine is an automatic analyzer for the in-vitro analysis of a sample of a biofluid, in particular, a blood sample.

In a preferred embodiment, the automated analysis machine comprises one receiving positions for a liquid vessel, or a plurality of receiving positions for a liquid vessel.

In a preferred embodiment, the automated analysis machine comprises one robotically displaceable transfer arm or a plurality of robotically displaceable transfer arms.

The present invention further provides the use of at least one system according to the invention in an automated analysis machine.

The term "biofluid" refers to a human or animal body fluid, which may be, but is not limited to, blood.

BRIEF DESCRIPTION OF THE DRAWINGS

These and other objects of the invention will be appreciated and understood by those skilled in the art from the detailed description of the preferred embodiments of the invention and the following drawings, in which like reference numerals refer to like elements.

DETAILED DESCRIPTION

In the following, embodiments of the invention will be described in detail with reference to the accompanying drawings. It should be understood that the following description of embodiments is not to be taken in a limiting sense. The scope of the invention is not intended to be limited by the embodiments described hereinafter by the drawings.

The drawings are to be regarded as being schematic representations, and elements illustrated in the drawings are not shown to scale. Rather, the various elements are represented such that their function and general purpose becomes apparent to a person skilled in the art. Any connection or coupling between components or functional blocks of physical or functional units shown in the drawings and described hereinafter may be implemented by an indirect connection or coupling.

Figure 1:
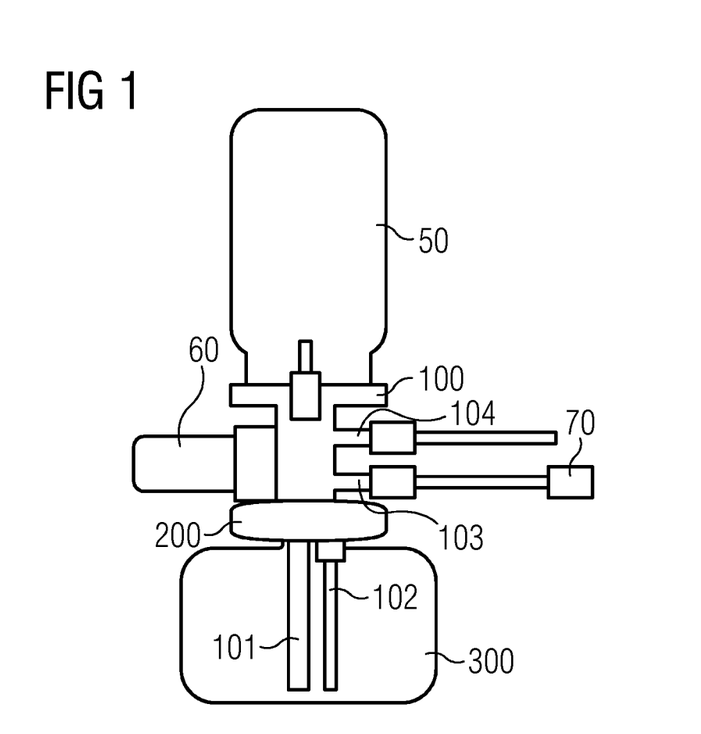
FIG. 1 shows a schematic view of a system in which liquid from a bottle is fed via a manifold and a valve to a liquid container incorporating features of the invention.

FIG. 1 shows a schematic view of a system in which a manifold 100 is placed on a liquid container 300 in order to control the supply of liquid such as cleaning liquid from a bottle 50 through a valve 60 to the liquid container 300. In order to fill the container via valve 60, the liquid to be filled to the container 300 is fed into the container 300 using the filling straw 101, wherein the liquid can be removed from the container 300 using the aspiration straw 102, and using the aspiration line connection 103 to which an aspiration line 70 is connected. Furthermore, a vent opening 104 is provided for the exchange of air.

As will be explained in further detail below, the pressure generating element 200 ensures there is a tight and sealed connection between the manifold 100 and the liquid container 300.

Figure 2:
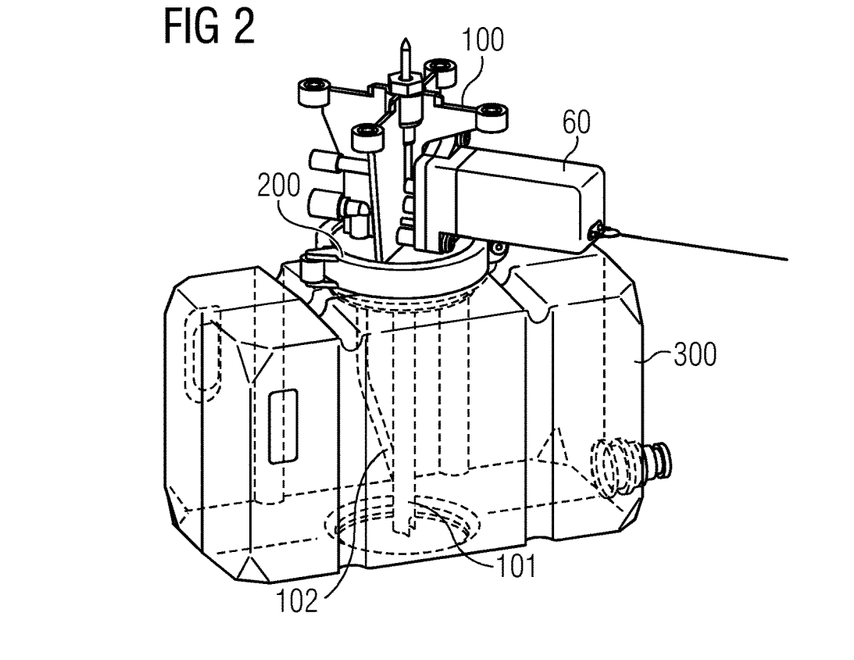
FIG. 2 shows a schematic perspective view of the system without the bottle when the manifold is connected to the liquid container.
Figure 3:
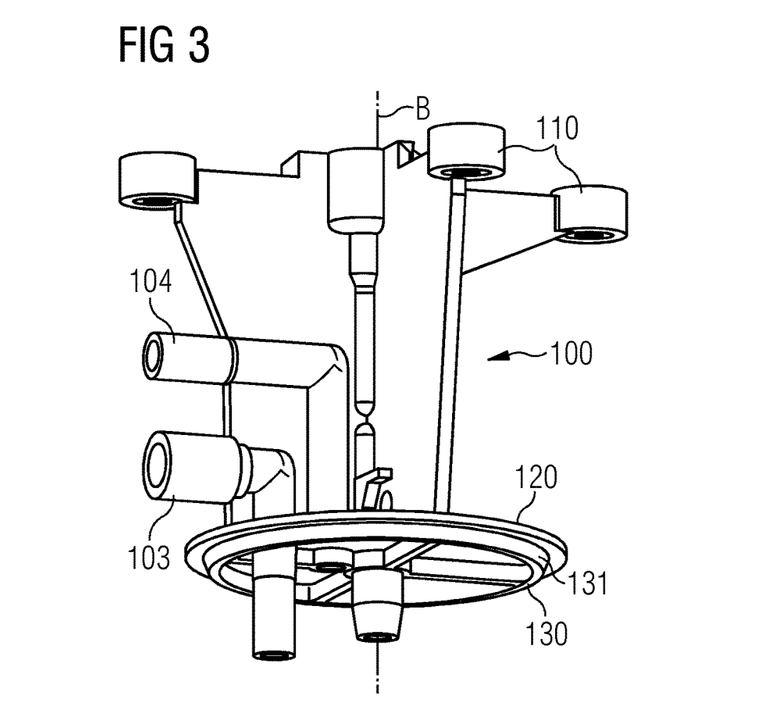
FIG. 3 shows a schematic perspective view of the manifold.

FIG. 2 shows a schematic perspective view with the container 300 and the manifold 100 in a first embodiment of a pressure generating element 200 in the form of a clamp ring. Referring also to FIG. 3 the manifold 100 comprises a support structure 110 with which the bottle 50 can be placed and held on the manifold 100. The manifold 100 further comprises a bottom plate 120, which is placed on an opening 310 of the liquid container 300, shown in further detail in FIGS. 4 and 5. The bottom plate 120 comprises at a lower surface facing the opening 310 of the liquid container 300 a circumferential sealing protrusion 130 having a conical shape and comprising an outer peripheral sealing surface 131. This surface 131 will be placed onto a support surface provided at the opening 310 of the liquid container 300.

Figure 4:
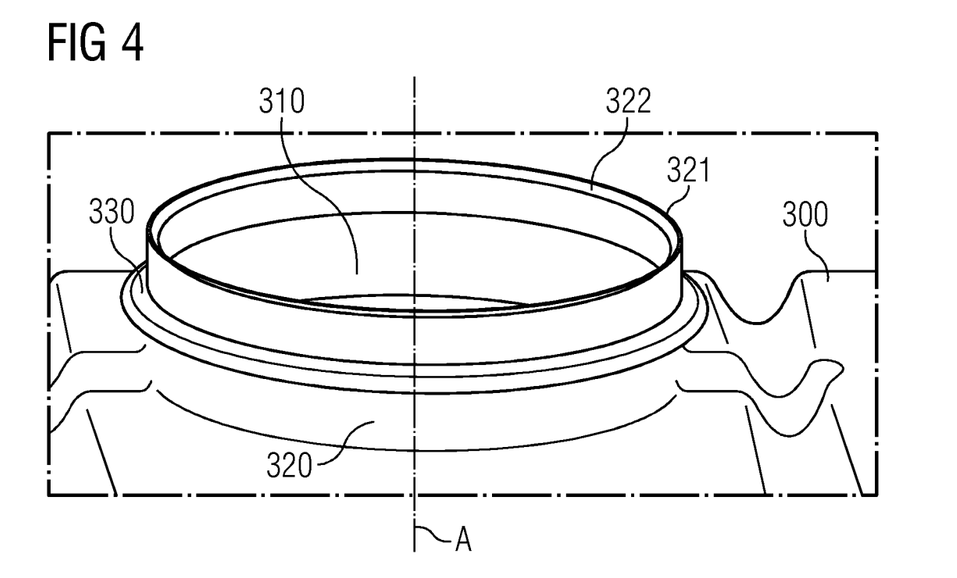
FIG. 4 shows an enlarged perspective view of the container opening onto which the manifold is placed.
Figure 5:
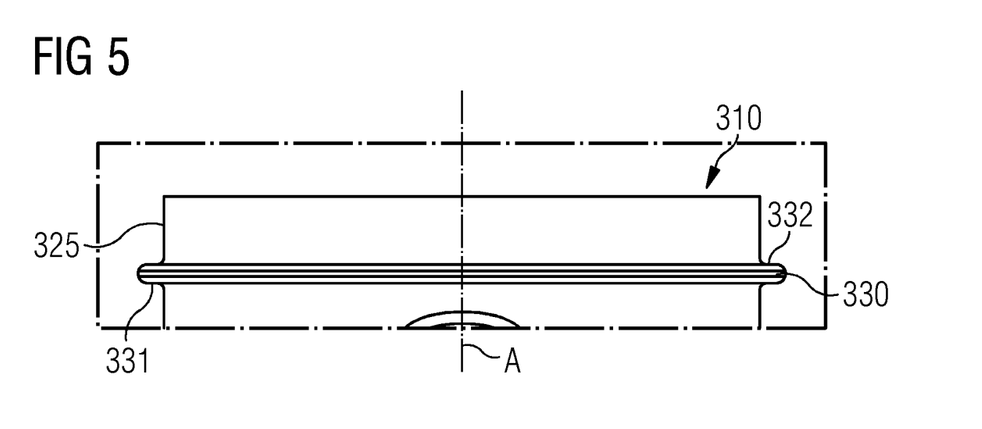
FIG. 5 shows an enlarged side view of the container opening.

As shown in FIGS. 4 and 5, the liquid container comprises the opening 310 for receiving the manifold 100. The liquid container 300 comprises a rim 320 by which the opening 310 is defined. The rim 320 comprises a conically-shaped upper end 321, wherein an inclined surface 322 is provided at the inner circumferential surface of the rim 320. This inner peripheral support surface 322 provides the support for placing the manifold 100 on the opening. The rim 320 further comprises, at its outer surface, a circumferential protrusion 330 extending on the outer surface 325 of the rim 320. The protrusion 330 provides a first surface 331 facing away from the opening 310 and provides a second surface 332 facing in the direction where the opening 310 is provided. The opening 310 in the embodiment shown is circular and comprises a central middle axis A. The manifold 100 also comprises a middle axis B shown in FIG. 3. When the manifold 100 is placed on the opening 310, the middle axis A of the opening coincides with the middle axis B of the manifold 100. The pressure generating element 200 will help to concentrically place the manifold 100 on the opening 310 of the liquid container 300.

In the embodiment shown in FIGS. 2 and 6-9, the pressure generating element 200 is designed as a clamp ring. As shown in more detail in FIGS. 8 and 9, the clamp ring is a ring-shaped element and is designed as a two-piece element with a first ring section 210 and a second ring section 230. The two ring sections are coupled by a hinge portion 240. When the manifold 100 is placed on the opening 310, the clamp ring is designed such that it can be pushed with one hand of the user over the bottom plate 120 of the manifold 100, and over the rim 320 of the opening 310 wherein the clamp ring furthermore covers the protrusion 330 of the liquid container 300. The free ends of the ring sections 210 and 230 are connected to each other by a locking latch 250 comprising a protrusion 251 provided on one of the ring sections which, in the closed position of the clamp ring, contacts a contact surface 231 provided on the other of the ring sections. The locking latch 250 and the protrusion 251 are provided on the free end of one of the ring sections, wherein the contact surface 231 is provided on the free end of the other ring section. The clamp ring can be moved from an open position (not shown) to the closed position shown in FIGS. 8 and 9, in which the diameter of the ring 200 is smaller compared to the open position in which the clamp ring 200 is already positioned on the opening, but the open ends are not yet locked by the locking latch 250.

Figure 6:
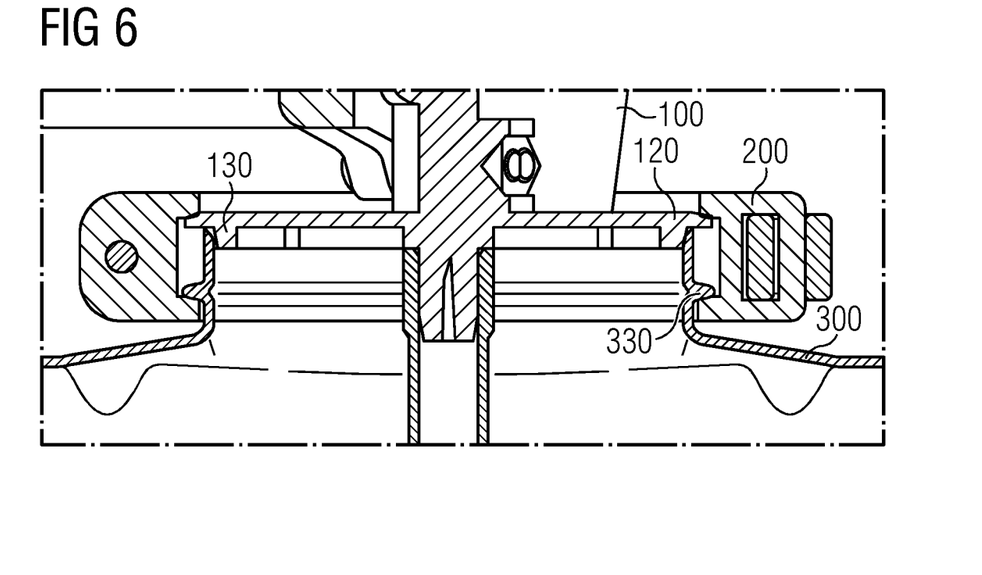
FIG. 6 shows an enlarged cross-sectional view of the connection of the manifold to the liquid container according to a first embodiment.
Figure 7:
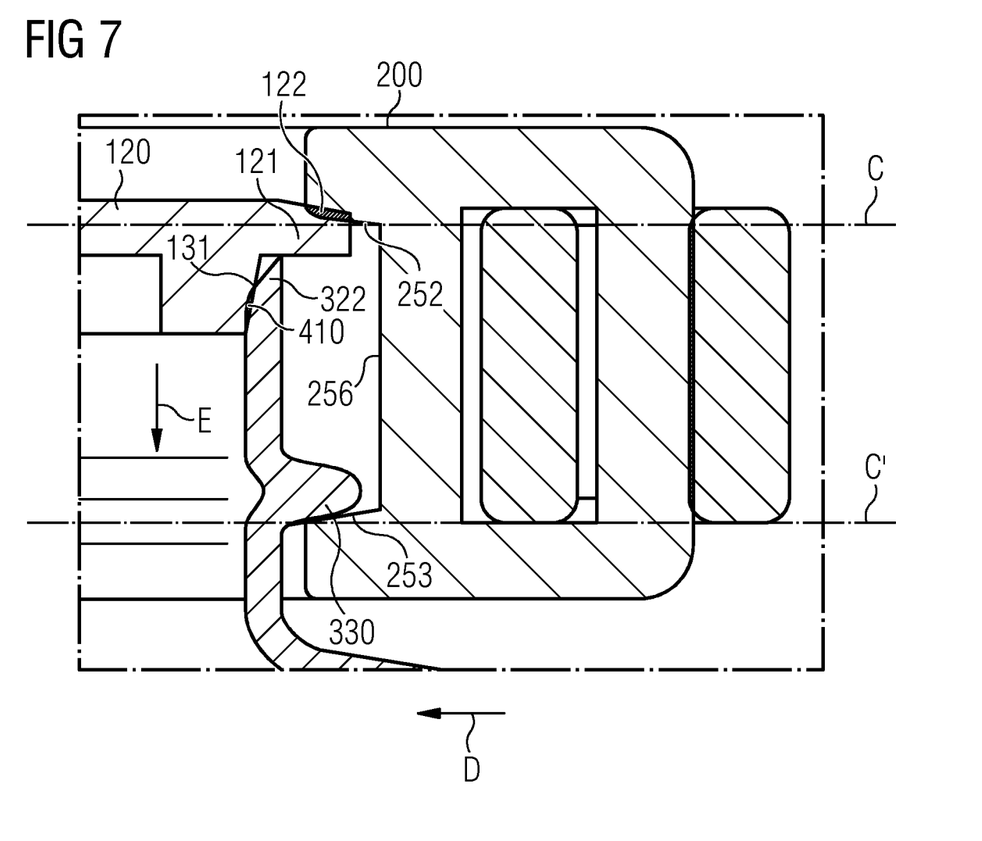
FIG. 7 shows an enlarged partial view of the connection shown in FIG. 6.
Figure 8:
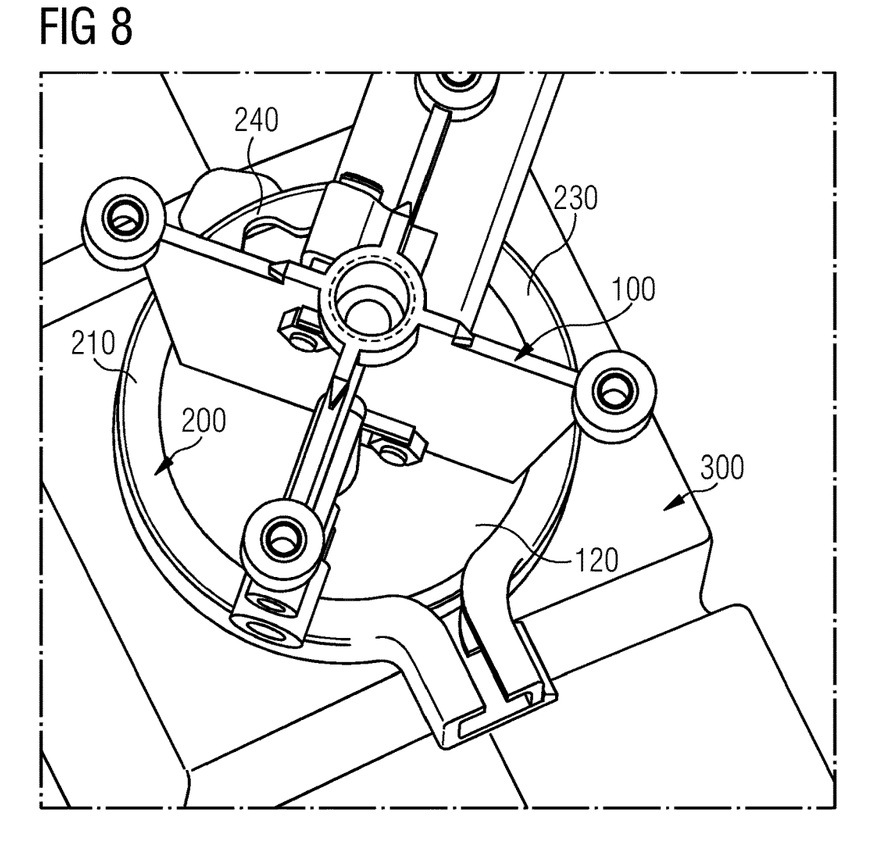
FIG. 8 shows the perspective view from above of the system shown in connection with FIGS. 4-7.
Figure 9:
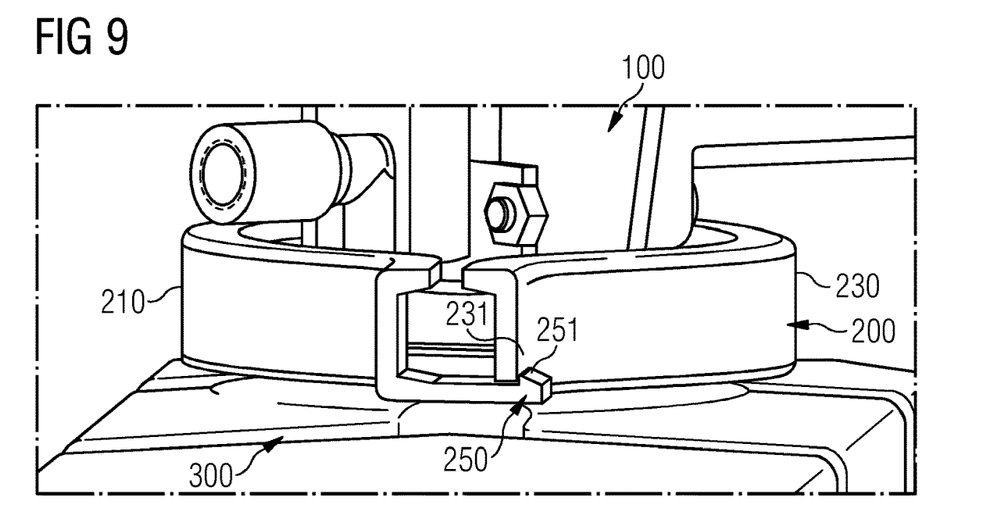
FIG. 9 shows an enlarged side view of the system of the embodiment described in connection with FIGS. 4-8.

The forming of the sealed connection between the manifold 100 and the liquid container 300 is explained in further detail in connection with FIGS. 6 and 7. As shown in FIGS. 6 and 7, the clamp ring 200 comprises an inner recessed area 256 into which the circumferential protrusion 330 of the liquid container 300 and the bottom plate 120 extend. Recessed area 256 is delimited by a first pressure applying surface 253 and a second pressure applying surface 252. The pressure applying surfaces 253 and 252 are oblique surfaces that are angled relative to an axis C which is perpendicular to the central axis A and B shown in FIGS. 3-5. When the clamp ring 200 is moved to the closed position, the pressure applying surfaces 253 and 252 move in direction of arrow D as shown in FIG. 7 and, thus, move in direction of the center of the clamp ring 200. Due to decreasing widths of the recessed area, and, thus the decreased distance between the pressure applying surfaces, the latter move in the direction of the central axis. The bottom plate 120 comprises a beveled edge portion 121 with a decreasing thickness towards the outer edge of the bottom plate. The beveled edge portion comprises the manifold pressure exposure surface 122. Accordingly, when the clamp ring 200 is closed, the second pressure applying surface 252 contacts the manifold pressure exposure surface 122 and slides in the direction of an increased thickness of the beveled edge portion 121. Accordingly, a force is applied through the second pressure applying surface 252 onto the manifold pressure exposure surface 122 and the manifold 100 is pressed in the direction of the arrow E (shown in FIG. 7) onto the opening 310. As the rim 320 comprises the inner peripheral support surface 322, the outer peripheral sealing surface 131 is pressed onto this inner peripheral support surface 322. Furthermore, the first pressure applying surface 253 contacts the surface 331 on protrusion 330 and presses the container 300 in the direction of the manifold 100. A contact area 410 provides a seal between the manifold 100 and the liquid container 300. As can be seen from the figures, no elastomer material is provided at the seal. The manifold 100 can be made of plastic material, for example, by injection molding, and the liquid container may also be generated from a material through injection molding. No elastic material is provided at the sealing edge.

As shown in FIG. 7 the angle between the first pressure applying surface and the axis C or C' perpendicular to the central axis determines the force with which the manifold 100 is pressed onto the opening 310. The amount of the angle between axis C and the second pressure applying surface 252 may be the same as the angle between the axis C' and the first pressure applying surface 253. The angle may be between 5° and 15°, preferably between 7° and 12°, further preferably around 10°. Accordingly, if the angle is +10° for the second pressure applying surface 252, it might be −10° for the first pressure applying surface 253.

Figure 10:
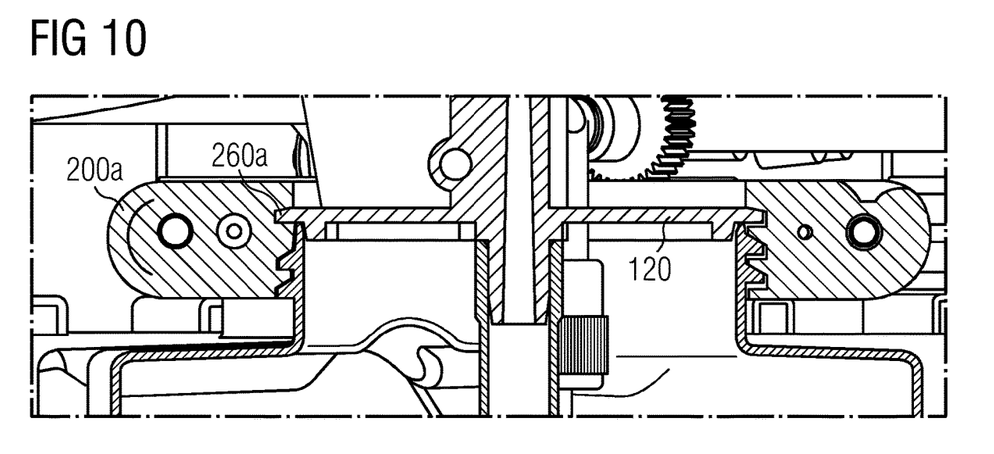
FIG. 10 shows an enlarged cross-sectional view of the system according to a further embodiment.
Figure 11:
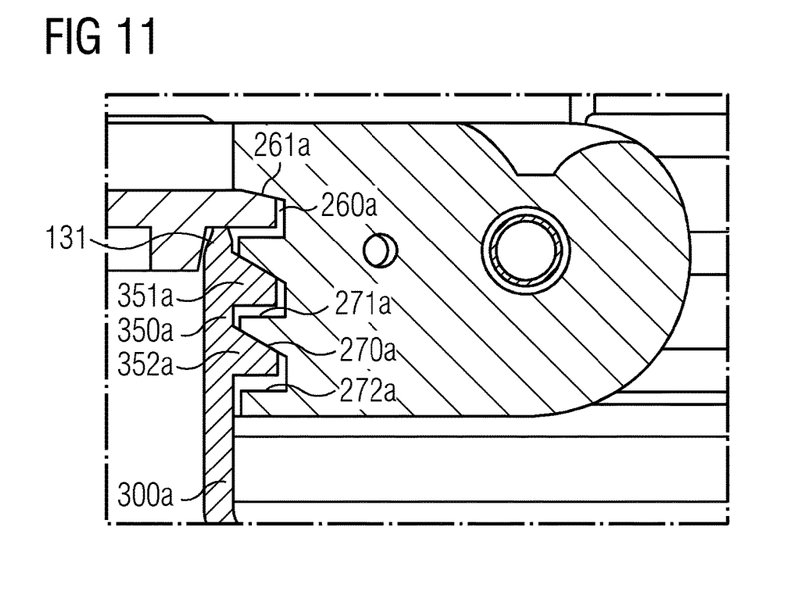
FIG. 11 shows a more detailed view of the cross-sectional view of FIG. 10 of the embodiment shown in FIG. 10.

FIGS. 10 and 11 show a further embodiment in which the manifold is the same. However, instead of using a clamp ring, a threaded ring 200a is used. The threaded ring 200a comprises a recess 260a for receiving the beveled edge portion of the bottom plate 120. The manifold 100 corresponds to the manifold described in connection with FIGS. 2-9. However, the pressure generating element is implemented as a threaded ring 200a and is, again, implemented as a two-piece element with a first ring section and a second ring section, which are connected at the connected ends. The other free ends of the two ring sections may be connected to each other via a locking structure not shown in the figures. The recess 260a comprises an inclined surface 261a, which plays the role of the second pressure applying surface, and which slides on the beveled edge portion. The liquid container 300a comprises an external thread portion 350a with at least two thread elements 351a and 352a. The two-part threaded ring 200a can also be moved over the bottom plate and the solid portion and, after the free ends are connected the threaded ring, can be screwed onto the solid portion 350a. The threaded ring 200a comprises an inner threaded portion 270a with two pressure applying surfaces 271a and 272a. When the threaded ring 200a is screwed onto the housing opening, the pressure applying surface 261a forces the bottom plate and, thus, the outer peripheral sealing surface 131 onto the inner peripheral support surface 322 (as shown in FIG. 7). The two pressure applying surfaces 271a and 272a force the liquid container 300a, especially the inner peripheral support surface, in the direction of the manifold 100 so that, again, a sealed connection is obtained at the area where the inner peripheral support surface is pressed onto the outer peripheral sealing surface 131, or vice versa. In this embodiment, the manifold does not have a threaded portion, wherein a union nut (the threaded ring) is used to tighten the screw connection and pull the container 300a to the manifold 100. Yet, it allows for adjustment of the orientation of the manifold 100 to the liquid container 300a independently of the applied torque. The screwed connection is disadvantageous if the manifold 100 is directly screwed to the liquid container 300a, as tolerances in the parts or threads result in different orientations of the manifold 100 to the container 300a when applying the same torque.

With the two embodiments above, a high sealing effective activity is obtained and the liquid container and the manifold may be oriented independently of the fastening structure that is needed to obtain an effective sealing. Accordingly, several liquid containers can be placed one next to the other. With the structure of the pressure generating element as a two-piece element implemented by either a threaded ring or a clamp ring, the connection between the manifold and the container can be easily achieved with a single hand of a user. Furthermore, the sealed connection can be easily released with a single hand by opening a latch mechanism, which keeps the two sections of the pressure generating element together.

From the above description, several conclusions can be drawn. The outer peripheral sealing surface 131 and the inner peripheral support surface 322 can both me made of an injection-molded material, and the injection-molded materials directly contact each other to provide the sealed connection between the manifold and the liquid container. Furthermore, the contact area where the inner peripheral support surface contacts the outer peripheral sealing surface is substantially free of elastomer material.

The manifold can further comprise the bottom plate 120 covering the openings 310 in the connected state. Hence, the bottom plate extends parallel to a first axis C extending perpendicular to the central axis A passing through the container and a center of the opening. The bottom plate 120 comprises a beveled edge portion 121 with a decreasing thickness of the plate in the direction of the outer edge of the bottom plate 120. The beveled edge portion is the manifold pressure exposure surface through which the manifold is pressed in the direction of the opening.

The pressure generating element 200 can comprise an inner circumferential inclined surface facing the beveled edge portion in the connected state, for example the pressure applying surface 252 shown in FIG. 7. This inner circumferential inclined surface is the second pressure applying surface.

The pressure generating element 200 can be a two-part element connected through a hinge portion. In the closed position, the pressure generating element 200 encloses the conically shaped rim 320 of the liquid container and the bottom plate 120.

The pressure generating element 200 may be implemented as a ring-shaped element configured as a clamp ring comprising a first ring section and a second ring section connected at first ends of the ring sections through the hinge portion. Each ring section can comprise an inner recessed area delimited in the axial direction of the ring-shaped element by the first pressure applying surface and the second pressure applying surface. The two ends of the first and second ring sections are connected to each other in the closed position by a locking latch. Furthermore, when the clamp ring is moved by the user to the closed position the diameter of the clamp ring is decreased and the second pressure applying surface is configured to slide on the beveled edge portion in order to press the outer peripheral sealing surface on the inner peripheral support surface.

As discussed in connection with FIG. 7, an absolute value of the first angle between the first pressure applying surface and the first axis extending perpendicular to the central middle axis passing through the center of the clamp ring corresponds to the absolute value of the second angle between the second pressure applying surface and the first axis. This angle determines how much pressure is applied onto the pressure exposure surfaces of the liquid container and of the manifold.

The liquid container can further comprise on its outer surface a circumferential protrusion with a first surface facing away from the opening wherein this first surface is the container pressure exposure surface. The pressure generating element may also be implemented as a threaded ring comprising a first ring section and a second ring section connected at first ends of the ring sections through the hinge portion. The second ends of the ring contact each other in the closed state and provide a recess for receiving the manifold pressure exposure surface.

The recess furthermore comprises the second pressure applying surface and in the closed state the threaded ring comprises a threaded circumferential portion providing the first pressure applying surface.

What is claimed is:

1. A system comprising:
    a liquid container, configured to hold a liquid, comprising an opening, a rim surrounding the opening such that the diameter of the opening decreases towards an interior of the liquid container to form a conically shaped inclined inner peripheral support surface, and a first pressure exposure surface;
    a manifold comprising a circumferential sealing protrusion having a conically shaped inclined outer peripheral sealing surface configured to form a seal when directly in contact with the conically shaped inclined inner peripheral support surface of the liquid container without an intervening elastic sealing material, an aspirating tube configured to aspirate liquid from the liquid container, a valve configured to fill the liquid container, and a second pressure exposure surface; and
    a pressure generating element, configured to be moved by a user between a closed position and an open position, comprising a circumferential first pressure applying surface and a second circumferential pressure applying surface,
    wherein the first pressure applying surface contacts the pressure exposure surface of the container and the second pressure applying surface contacts the second pressure exposure surface of the manifold in the open position, and wherein the first and second pressure applying surfaces apply force to the first and second pressure exposure surfaces in the closed position to press the outer peripheral sealing surface of the manifold onto the inner peripheral support surface of the liquid container, forming a sealed connection between the liquid container and the manifold.

2. The system according to claim 1, wherein the outer peripheral sealing surface and the inner peripheral support surface are made of an injection molded material, wherein the injection molded materials directly contact one another to provide the sealed connection between the manifold and the liquid container.

3. The system according to claim 1, wherein the manifold comprises a bottom plate covering the opening in the connected state, the bottom plate extending parallel to a first axis extending perpendicular to a central middle axis passing though the container and a center of the opening, the bottom plate comprises a beveled edge portion with decreasing thickness of the plate in direction of the outer edge of the bottom plate, wherein the beveled edge portion is the second pressure exposure surface.

4. The system according to claim 3, wherein the pressure generating element comprises an inner circumferential inclined surface facing the beveled edge portion in the connected state, wherein the inner circumferential inclined surface is the second pressure applying surface.

5. The system according to claim 3, wherein the pressure generating element is a two-part element connected through a hinge portion, wherein in the closed position the pressure generating element encloses the rim.

6. The system according to claim 5, wherein the pressure generating element is a ring shaped element configured as a clamp ring comprising a first ring section and a second ring section connected at first ends of the ring sections through the hinge portion, wherein each ring section comprises an inner recessed area delimited in the axial direction of the ring shaped element by the first pressure applying surface and the second pressure applying surface, wherein the second ends of the first and second ring sections are connected to each other in the closed position by a locking latch.

7. The system according to claim 6, wherein when the clamp ring is moved by the user to the closed position the diameter of the clamp ring is decreased and the second pressure applying surface is configured to slide on the beveled edge portion in order to press the outer peripheral sealing surface on the inner peripheral support surface.

8. The system according to claim 6 wherein an absolute value of a first angle between the first pressure applying surface and a first axis extending perpendicular to a central middle axis passing through a center of the clamp ring corresponds to the absolute value of a second angle between the second pressure applying surface and the first axis.

9. The system according to claim 1, wherein the liquid container comprises, on an outer surface, a circumferential protrusion with a first surface facing away from the opening, wherein the first surface is the container pressure exposure surface.

10. The system according to claim 5, wherein the pressure generating element comprises a threaded ring comprising a first ring section and a second ring section connected at first ends of the ring sections through the hinge portion, wherein the second ends of the ring sections contact each other in the closed state and provide a recess for receiving the manifold pressure exposure surface.

11. The system according to claim 10, wherein the recess comprises the second pressure applying surface, wherein in the closed state the threaded ring comprises a threaded circumferential portion providing the first pressure applying surface.

* * * * *